United States Patent
Qiu et al.

(10) Patent No.: US 10,929,150 B2
(45) Date of Patent: Feb. 23, 2021

(54) OPTICAL LINE TERMINAL AND METHOD FOR UPGRADING PRIMARY DEVICE AND SECONDARY DEVICE OF OPTICAL LINE TERMINAL

(71) Applicant: Huawei Technologies Co., Ltd., Guangdong (CN)

(72) Inventors: Xiaodong Qiu, Shenzhen (CN); Liankui Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 204 days.

(21) Appl. No.: 16/110,625

(22) Filed: Aug. 23, 2018

(65) Prior Publication Data

US 2018/0365029 A1 Dec. 20, 2018

Related U.S. Application Data

(63) Continuation of application No. PCT/CN2016/074449, filed on Feb. 24, 2016.

(51) Int. Cl.
*G06F 1/24* (2006.01)
*G06F 9/00* (2006.01)
*G06F 9/445* (2018.01)
*G06F 13/20* (2006.01)
*H04B 10/25* (2013.01)
(Continued)

(52) U.S. Cl.
CPC ........ *G06F 9/44505* (2013.01); *G06F 3/0619* (2013.01); *G06F 3/0647* (2013.01); *G06F 3/0679* (2013.01); *G06F 8/656* (2018.02); *G06F 9/445* (2013.01); *G06F 13/20* (2013.01);
(Continued)

(58) Field of Classification Search
CPC ...... G06F 9/44505; G06F 9/445; G06F 8/656; G06F 3/0619; G06F 3/0647; G06F 3/0679; G06F 13/20; H04B 10/25; H04Q 11/0062; H04Q 2011/0079
See application file for complete search history.

(56) References Cited

U.S. PATENT DOCUMENTS

| 2007/0162565 A1 | 7/2007 | Hanselmann |
| 2009/0214206 A1 | 8/2009 | Ozaki |

(Continued)

FOREIGN PATENT DOCUMENTS

| CN | 2812115 Y | 8/2006 |
| CN | 1828535 A | 9/2006 |

(Continued)

*Primary Examiner* — Xuxing Chen
(74) *Attorney, Agent, or Firm* — Hauptman Ham, LLP (57) ABSTRACT

An optical line terminal and a method for upgrading a primary device and a secondary device of the optical line terminal are provided. The secondary device receives a stepwise reset notification sent by the primary device; the secondary device resets a control chip according to the received stepwise reset notification, and sends a request message to the primary device after the control chip is reset, where the request message is used to request the primary device to deliver new configuration data; the secondary device obtains the new configuration data delivered by the primary device; and the secondary device restores data of the control chip by using the new configuration data delivered by the primary device. In the embodiments of the present disclosure, only the control chip of the secondary device needs to be reset and upgraded, and other hardware structures of the secondary device do not need to be reset.

14 Claims, 4 Drawing Sheets

(51) Int. Cl.
*G06F 8/656* (2018.01)
*G06F 3/06* (2006.01)
*H04Q 11/00* (2006.01)

(52) U.S. Cl.
CPC ......... *H04B 10/25* (2013.01); *H04Q 11/0062* (2013.01); *H04Q 2011/0079* (2013.01)

(56) References Cited

U.S. PATENT DOCUMENTS

| | | |
|---|---|---|
| 2011/0231833 A1 | 9/2011 | Narayanan et al. |
| 2014/0146660 A1 | 5/2014 | Wang |
| 2015/0040115 A1 | 2/2015 | Capper |

FOREIGN PATENT DOCUMENTS

| | | |
|---|---|---|
| CN | 102053849 A | 5/2011 |
| CN | 102185718 A | 9/2011 |
| CN | 102238093 A | 11/2011 |
| CN | 102833639 A | 12/2012 |
| CN | 103414590 A | 11/2013 |
| CN | 103490931 A | 1/2014 |
| WO | 2013161374 A1 | 10/2013 |

OPTICAL LINE TERMINAL AND METHOD FOR UPGRADING PRIMARY DEVICE AND SECONDARY DEVICE OF OPTICAL LINE TERMINAL

CROSS-REFERENCE TO RELATED APPLICATIONS

This application is a continuation of International Application No. PCT/CN2016/074449 filed on Feb. 24, 2016, the disclosure of which is hereby incorporated by reference in its entirety.

TECHNICAL FIELD

Embodiments of the present application relate to the communications field, and in particular, to an optical line terminal (OLT) and a method for upgrading a primary device and a secondary device of the optical line terminal.

BACKGROUND

In a frame-shaped communications device with a distributed architecture, in consideration of costs, redundancy backup is usually performed only on most critical boards (a main control board, a network board, and an upstream board), and redundancy backup is not performed on a large quantity of IO (Input/Output) boards (except an IO board that is protected by using TypeX). During version upgrading of these devices, board software and chip firmware of the IO board without redundancy backup also need to be upgraded, and the IO board is restarted to make a new version to take effect. Consequently, a connected service carried on the IO board is interrupted (interruption may last for at least one minute).

Currently, the frame-shaped communications device with the distributed architecture is upgraded on a per-board basis and boards are upgraded one by one. During upgrading of each board, all chips on the board need to be synchronously reset, and each board cannot work normally before being upgraded. During version upgrading of an IO board that does not use a redundancy backup protection technology, all chips on the IO board needs to be reset, and a service interruption time is two to three minutes. Consequently, a connection between an office end device and each of various types of DSLs (Digital Subscriber Line) and various types of PON (Passive Optical Network) terminals is interrupted and goes offline. It takes one to three minutes to put the connection online again. Consequently, all types of connected services of a user are interrupted, and a user accessed by using PPP (Point-to-Point Protocol) needs to re-dial. During version upgrading of an IO board that uses the redundancy backup protection technology, an active process and a standby process need to be independently run, and data needs to be backed up in real time between the active process and the standby process. Consequently, consumption of memory resources and CPU (Central Processing Unit) resources of the IO board is significantly increased, hardware costs of the IO board are increased, and processing performance is relatively greatly affected. In addition, running a dual-process mechanism on the IO board causes a complex software architecture, and extremely high software complexity affects development efficiency and reliability of board software.

SUMMARY

Embodiments of the present disclosure provide an optical line terminal and a method for upgrading a primary device and a secondary device of the optical line terminal, to shorten a service interruption time during device upgrading while TO board costs and software architecture complexity are not increased.

According to a first aspect, a method for upgrading a primary device and a secondary device of an optical line terminal is provided, including:

receiving, by the secondary device, a stepwise reset notification sent by the primary device;

resetting, by the secondary device, a control chip according to the received stepwise reset notification, and sending a request message to the primary device after the control chip is reset, where the request message is used to request the primary device to deliver new configuration data;

obtaining, by the secondary device, the new configuration data delivered by the primary device; and restoring, by the secondary device, data of the control chip by using the new configuration data delivered by the primary device.

With reference to the first aspect, in a first possible implementation of the first aspect, before the resetting, by the secondary device, a control chip, the method further includes:

saving, by the secondary device, forwarding data of a forwarding chip to a reset nonvolatile storage area, where an active area and a standby area are not set for the forwarding chip; and after the obtaining, by the secondary device, the new configuration data delivered by the primary device, the method further includes:

generating, by the secondary device, mirror data of a forwarding entry of the forwarding chip according to the obtained new configuration data delivered by the primary device and the forwarding data that is of the forwarding chip and that is stored in the reset nonvolatile storage area; and upgrading, by the secondary device, the forwarding chip, and updating the forwarding entry of the forwarding chip according to the mirror data of the forwarding entry of the forwarding chip after the forwarding chip is upgraded, so that the forwarding chip forwards data according to the updated forwarding entry.

With reference to the first aspect, in a second possible implementation of the first aspect, after the obtaining, by the secondary device, the new configuration data delivered by the primary device, the method further includes:

generating, by the secondary device, a forwarding entry of a new version according to the new configuration data delivered by the primary device, and delivering the forwarding entry of the new version to a standby area, where the forwarding chip has an active area and a standby area;

upgrading, by the secondary device, the standby area of the forwarding chip, and switching, after the standby area of the forwarding chip is upgraded, a service carried in the active area of the forwarding chip to the standby area of the forwarding chip; and upgrading, by the secondary device, the active area of the forwarding chip.

With reference to the first aspect, in a third possible implementation of the first aspect, before the resetting, by the secondary device, a control chip, the method further includes:

recording, by the secondary device, bandwidth allocation information of an ONU (Optical network terminal); and after the data of the control chip is restored, the method further includes:

delivering, by the secondary device, the bandwidth allocation information to an online ONU, where the bandwidth allocation information is used by the online ONU to switch bandwidth.

With reference to the first aspect, in a fourth possible implementation of the first aspect, before the resetting, by the secondary device, a control chip, the method further includes:

saving, by the secondary device, configuration information of an ONU to a reset nonvolatile storage area; and after the data of the control chip is restored, the method further includes:

reconfiguring, by the secondary device, the configuration information of the ONU when the configuration information of the ONU that is stored in the reset nonvolatile storage area is inconsistent with configuration information of the ONU that is delivered by the primary device.

According to a second aspect, a secondary device is provided, including:

a transceiver unit, configured to receive a stepwise reset notification sent by a primary device;

a reset unit, configured to reset a control chip according to the stepwise reset notification received by the transceiver unit, where the transceiver unit is further configured to: send a request message to the primary device after the control chip is reset, where the request message is used to request the primary device to deliver new configuration data; and obtain the new configuration data delivered by the primary device; and a data restoration unit, configured to restore data of the control chip by using the new configuration data delivered by the primary device.

With reference to the second aspect, in a first possible implementation of the second aspect, a first storage unit further is further included, and is configured to: before the reset unit resets the control chip, save forwarding data of a forwarding chip to a reset nonvolatile storage area, where an active area and a standby area are not set for the forwarding chip; and the data restoration unit is further configured to:

after the transceiver unit obtains the new configuration data delivered by the primary device, generate mirror data of a forwarding entry of the forwarding chip according to the obtained new configuration data delivered by the primary device and the forwarding data that is of the forwarding chip and that is stored in the reset nonvolatile storage area; and upgrade the forwarding chip, and update the forwarding entry of the forwarding chip according to the mirror data of the forwarding entry of the forwarding chip after the forwarding chip is upgraded, so that the forwarding chip forwards data according to the updated forwarding entry.

With reference to the second aspect, in a second possible implementation of the second aspect, the data restoration unit is further configured to:

after the transceiver unit obtains the new configuration data delivered by the primary device, generate a forwarding entry of a new version according to the new configuration data delivered by the primary device, and deliver the forwarding entry of the new version to a standby area, where the forwarding chip has an active area and a standby area;

upgrade the standby area of the forwarding chip, and switch, after the standby area of the forwarding chip is upgraded, a service carried in the active area of the forwarding chip to the standby area of the forwarding chip; and upgrade the active area of the forwarding chip.

With reference to the second aspect, in a third possible implementation of the second aspect, the secondary device further includes:

a recording unit, configured to: before the reset unit resets the control chip, record bandwidth allocation information of an ONU, where the transceiver unit is further configured to deliver the bandwidth allocation information to an online ONU, where the bandwidth allocation information is used by the online ONU to switch bandwidth.

With reference to the second aspect, in a fourth possible implementation of the second aspect, the secondary device further includes:

a second storage unit, configured to: before the reset unit resets the control chip, save configuration information of an ONU to a reset nonvolatile storage area; and a configuration unit, configured to: after the data restoration unit restores the data of the control chip, reconfigure the configuration information of the ONU when the configuration information of the ONU that is stored in the reset nonvolatile storage area is inconsistent with configuration information of the ONU that is delivered by the primary device.

According to the embodiments of the present disclosure, the secondary device receives the stepwise reset notification sent by the primary device, the secondary device resets the control chip according to the received stepwise reset notification, and sends the request message to the primary device after the control chip is reset, where the request message is used to request the primary device to deliver the new configuration data, the secondary device obtains the new configuration data delivered by the primary device, and the secondary device restores the data of the control chip by using the new configuration data delivered by the primary device. In the embodiments of the present disclosure, only the control chip of the secondary device needs to be reset and upgraded, and other hardware structures of the secondary device do not need to be reset, so that a service is forwarded while the control chip is reset, and the service is not interrupted during upgrading of the secondary device.

BRIEF DESCRIPTION OF THE DRAWINGS

To describe the technical solutions in the embodiments of the present disclosure more clearly, the following briefly describes the accompanying drawings required for describing the embodiments.

DETAILED DESCRIPTION

To make the objectives, technical solutions, and advantages of the embodiments of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

Figure 1:
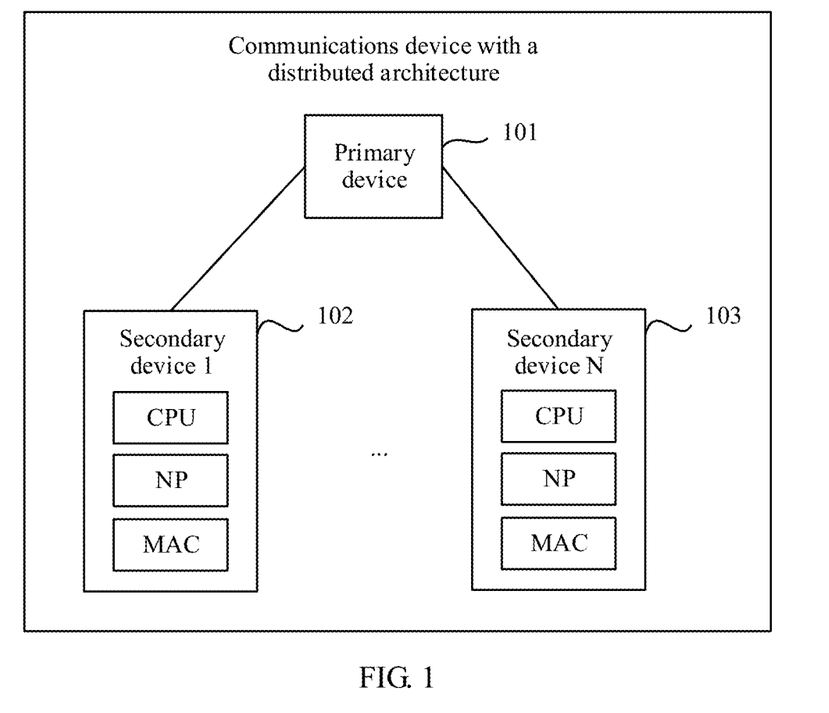
FIG. 1 is a schematic structural diagram of a distributed communications device to which an embodiment of the present disclosure is applicable.

The embodiments of the present disclosure are applicable to a scenario of upgrading a communications device with a distributed architecture. FIG. 1 is an example of a schematic diagram of a communications device with a distributed architecture to which an embodiment of the present disclosure is applicable. As shown in FIG. 1, a communications device with a distributed architecture is used. The communications device with the distributed architecture includes a primary device and at least one secondary device. The secondary device includes a control chip on a control plane, a data packet forwarding chip on a forwarding plane, and a MAC (Media Access Control) layer, and the control plane and the forwarding plane of the secondary device can be independently reset.

For example, the communications device with the distributed architecture is a distributed OLT device, the primary device is a main control board, and the secondary device is an IO board. A control chip on the IO board is a CPU, and a forwarding chip may be an ASIC (Application-Specific Integrated Circuit), an NP (Network Processor), or an FPGA (Field Programmable Gate Array). The control chip may convert configuration data delivered by the primary device into forwarding entry data, and deliver the forwarding entry data to the forwarding chip. The forwarding chip may forward data according to the forwarding entry data.

During upgrading of the communications device with the distributed architecture, the primary device is upgraded first, and then the secondary device is upgraded. Because a redundancy backup mechanism is set for the primary device, only an active area and a standby area of the primary device need to be separately upgraded during upgrading of the primary device, to implement upgrading without service interruption. The redundancy backup mechanism is not set for most secondary devices. During upgrading of a secondary device for which the redundancy backup mechanism is not set, all hardware structures in the secondary device need to be reset, and consequently a service carried on the secondary device is interrupted for two to four minutes. A secondary device having the redundancy backup mechanism is upgraded in a manner that is the same as a manner of upgrading the primary device. However, because the redundancy backup mechanism is set for the secondary device, a quantity of resources required when a same quantity of users access the secondary device also increases correspondingly, and consequently excessively high costs are caused.

Figure 2:
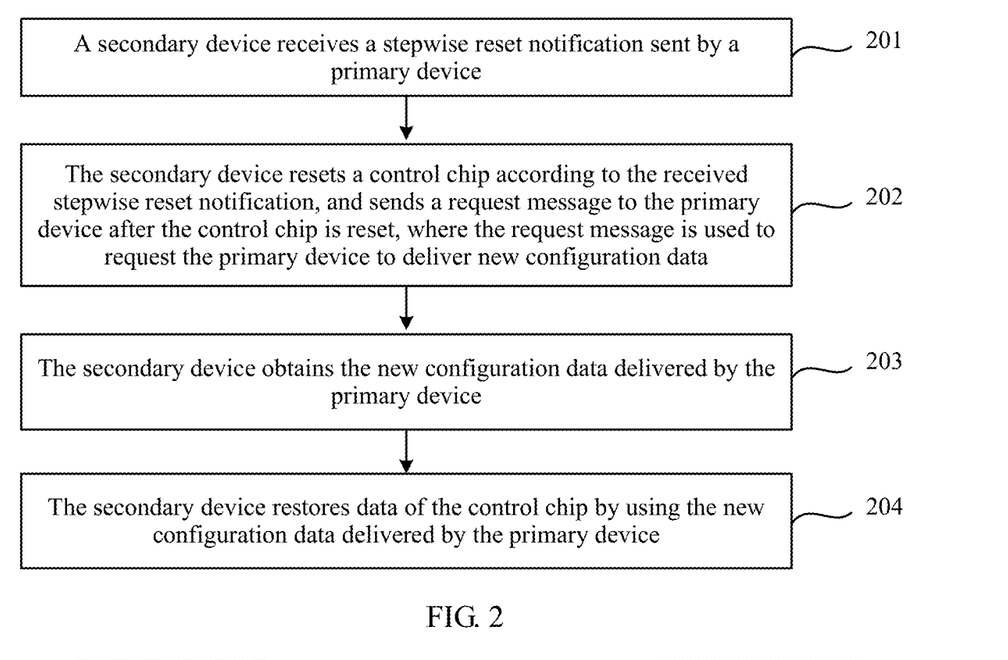
FIG. 2 is a schematic flowchart of a method for upgrading a primary device and a secondary device of an optical line terminal according to an embodiment of the present disclosure.

Based on the foregoing descriptions, FIG. 2 is an example of a method procedure for upgrading a primary device and a secondary device of an optical line terminal according to an embodiment of the present disclosure. The method procedure may be performed by the secondary device such as an IO board.

As shown in FIG. 2, the method procedure specifically includes the following steps:

Step 201: The secondary device receives a stepwise reset notification sent by the primary device.

Step 202: The secondary device resets a control chip according to the received stepwise reset notification, and sends a request message to the primary device after the control chip is reset, where the request message is used to request the primary device to deliver new configuration data.

Step 203: The secondary device obtains the new configuration data delivered by the primary device.

Step 204: The secondary device restores data of the control chip by using the new configuration data delivered by the primary device.

Specifically, after the primary device is upgraded, the primary device instructs the secondary device to perform upgrading. In this case, the primary device sends the stepwise reset notification to the secondary device. The stepwise reset notification is used to instruct the secondary device to perform upgrading in a stepwise reset mode. Alternatively, the primary device may send a one-off reset notification to the secondary device. The overall reset notification is used to instruct the secondary device to perform upgrading in a one-off reset mode. When the secondary device is upgraded by using a one-off reset method, a service carried by the secondary device is interrupted. In step 201, the secondary device receives the stepwise reset notification sent by the primary device, so that the secondary device starts to perform upgrading according to the stepwise reset notification.

In step 202, after the secondary device receives the stepwise reset notification sent by the primary device, the secondary device resets the control chip according to the received stepwise reset notification. Before resetting the control chip, the secondary device needs to save a reset mode flag of the secondary device to a reset nonvolatile storage area. For example, when the reset mode flag that is saved to the reset nonvolatile storage area by the secondary device is 1, it indicates that a reset mode of the secondary device is stepwise reset, that is, only the control chip is reset, and other hardware structures such as a forwarding chip and a medium access system are not reset and are still working. When the reset mode flag that is saved to the reset nonvolatile storage area by the secondary device is 0, it indicates that a reset mode of the secondary device is one-off reset, and all hardware structures of the secondary device need to be initialized. A function of the reset mode flag is to enable the control chip to know an initialization mode and a subsequent processing procedure after being reset. The reset nonvolatile storage area is located in a memory, and is a separate area divided from the memory, and data stored in the area is not lost during resetting of the control chip.

After the secondary device resets the control chip, the control chip is initialized, and re-establishes a connection to the primary device. The secondary device sends the request message to the primary device to request the primary device to deliver the new configuration data to the secondary device. The request message may further include a reset complete notification, and the reset complete notification indicates that the secondary device has been stepwise reset. It takes a relatively short time to reset the control chip. After being reset, the control chip further needs to be initialized and the data of the control chip further needs to be restored.

After receiving the request message sent by the secondary device, the primary device delivers the new configuration data to the secondary device. The delivered new configuration data is used to restore the data of the control chip of the secondary device and restore a forwarding entry of the forwarding chip.

In step 203, after the primary device delivers the new configuration data to the secondary device according to the request message sent by the secondary device, the secondary device may obtain the new configuration data delivered by the primary device. The new configuration data delivered by the primary device may be used to restore the data of the control chip of the secondary device, or may be used to restore data of the forwarding chip.

In step 204, after the secondary device receives the new configuration data delivered by the primary device, the secondary device restores the data of the control chip by using the new configuration data delivered by the primary device, so that the control chip runs according to an upgraded version, to control the forwarding chip to forward data according to a new forwarding entry.

Specifically, after the primary device delivers the new configuration data, the forwarding entry, that is, an image file, of the forwarding chip is first prepared in memory of the control chip according to a format required by the forwarding chip. After the image file is prepared, the forwarding chip suspends working, and quickly migrates the image file from the memory of the control chip to a memory of the forwarding chip, to overwrite an original forwarding entry. If the memory of the forwarding chip is divided into an active area and a standby area, the forwarding entry of the forwarding chip may be restored according to the new configuration data delivered by the primary device.

When the forwarding chip of the secondary device does not have a redundancy backup mechanism, before the secondary device resets the control chip, the secondary device saves the forwarding data of the forwarding chip to the reset nonvolatile storage area. An active area and a standby area are not set for the forwarding chip, that is, there is no redundancy backup mechanism. The forwarding chip of the secondary device is controlled by the control chip, and forwards data based on forwarding entry configuration data delivered by the primary device. The forwarding chip is still running in a process of data restoration after the control chip is reset, and unlike the control chip, the forwarding chip is not reset.

After the secondary device obtains the new configuration data delivered by the primary device, the secondary device generates, according to the obtained new configuration data delivered by the primary device and the forwarding data that is of the forwarding chip and that is stored in the reset nonvolatile storage area, mirror data of a forwarding entry that is of the forwarding chip and that is corresponding to firmware of a new version. The mirror data is used to restore the forwarding entry of the forwarding chip. After the firmware is upgraded, the forwarding chip may update the forwarding entry according to the mirror data, so that the forwarding chip forwards data according to the new firmware and the new forwarding entry. The secondary device may temporarily store the generated mirror data of the forwarding entry of the forwarding chip in the memory of the control chip, and when updating the forwarding entry, copy the mirror data into memory of the forwarding chip in a DMA (Direct Memory Access) manner.

After the data of the control chip is restored, the secondary device starts to upgrade the forwarding chip. The secondary device suspends forwarding of the forwarding chip, upgrades firmware and microcode of the forwarding chip, and after the forwarding chip is upgraded, updates the forwarding entry of the forwarding chip according to the mirror data of the forwarding entry of the forwarding chip, so that the forwarding chip forwards the data according to the updated forwarding entry. That the forwarding chip forwards the data means that the forwarding chip forwards a data packet according to the forwarding entry. The secondary device may quickly update the forwarding entry of the forwarding chip in a DMA manner, or may quickly update the forwarding entry of the forwarding chip in another manner.

Because the forwarding chip does not need to be reset together with the control chip, the forwarding chip does not need to spend a long time waiting for resetting and data restoration of the control chip, and the forwarding chip can continue to perform a forwarding task provided that the firmware and the microcode are upgraded and the forwarding entry is updated. In this process, a service carried by the secondary device needs to be interrupted for only a few seconds, so that an interruption time during upgrading of the secondary device is shortened.

Preferably, when the forwarding chip of the foregoing secondary device has a redundancy backup mechanism, an active area and a standby area are set for the forwarding chip of the secondary device, that is, the forwarding chip of the secondary device is divided into the active area and the standby area. After obtaining the new configuration data delivered by the primary device, the secondary device generates a forwarding entry of a new version according to the new configuration data delivered by the primary device, and delivers the forwarding entry of the new version to the standby area.

After the data of the control chip is restored, the secondary device upgrades the standby area of the forwarding chip, and starts to upgrade firmware and microcode in the standby area of the forwarding chip. After upgrading the standby area of the forwarding chip, the secondary device switches an active working area and a standby working area of the forwarding chip, and switches a service carried in the active area of the forwarding chip to the standby area of the forwarding chip. Then, an original active area of the forwarding chip is upgraded, so that the forwarding chip of the secondary device is upgraded.

In a manner of separately upgrading the active area and the standby area of the forwarding chip, the forwarding chip does not need to be reset, either, and the carried service only needs to be switched between the active area and the standby area of the forwarding chip, so that the carried service is not interrupted during upgrading of the forwarding chip.

Preferably, to enable an accessed ONU not to go offline in a process of upgrading the control chip of the secondary device, the secondary device needs to first record bandwidth allocation information of the ONU before resetting the control chip. The bandwidth allocation information of the ONU that is recorded by the secondary device may be delivered to an online ONU after the data of the control chip is restored, and bandwidth is allocated to the accessed online ONU in a bandwidth allocation manner that is used before upgrading is performed. The recorded bandwidth allocation information of the ONU may be stored in the reset nonvolatile storage area. Data stored in the reset nonvolatile storage area is not lost in a process of resetting the control chip.

After the data of the control chip is restored, the secondary device delivers the bandwidth allocation information to the accessed online ONU. The bandwidth allocation information is used by an online ONU to switch bandwidth. The online ONU may perform one-off bandwidth switching according to the delivered bandwidth allocation information. A switching manner may be DBA (Dynamic Bandwidth Assignment), and the DBA may be used to dynamically switch bandwidth within a microsecond or a millisecond.

After the data of the control chip is restored, the bandwidth allocation information of the accessed online ONU is updated in a DBA manner, so that bandwidth can be dynamically switched while the ONU does not go offline.

Preferably, to enable an accessed ONU not to go offline in a process of upgrading the control chip of the secondary device, the secondary device needs to first store configuration information of the ONU in the reset nonvolatile storage area before resetting the control chip. Data stored in the reset nonvolatile storage area is not lost in a process of resetting the control chip.

After the data of the control chip is restored, the secondary device checks the configuration information of the accessed online ONU, to determine whether a service runs normally while the ONU does not go offline. When the secondary device determines that the configuration information of the ONU that is stored in the reset nonvolatile storage area is inconsistent with configuration information of the ONU that is delivered by the primary device, the secondary device reconfigures the configuration information of the ONU according to the configuration information of the ONU that is delivered by the primary device. When determining that the configuration information of the ONU that is stored in the reset nonvolatile storage area is consistent with the configuration information of the ONU that is delivered by the primary device, the secondary device does not need to reconfigure the configuration information of the ONU.

Whether the service can still run normally while the online ONU does not go offline is determined by determining whether the configuration information of the ONU that is delivered by the primary device is consistent with the configuration information of the ONU that is stored in the reset nonvolatile storage area.

According to the foregoing embodiment, the secondary device receives the stepwise reset notification sent by the primary device, the secondary device resets the control chip, and sends the request message to the primary device, where the request message is used to request the primary device to deliver the new configuration data, the secondary device obtains the new configuration data delivered by the primary device, and the secondary device restores the data of the control chip by using the new configuration data delivered by the primary device. In this embodiment of the present disclosure, only the control chip of the secondary device needs to be reset and upgraded, and other hardware structures of the secondary device do not need to be reset, so that a service is forwarded while the control chip is reset, and the service is not interrupted during upgrading of the secondary device. After the firmware and the microcode are upgraded, the forwarding chip of the secondary device only needs to update the forwarding entry in a fast memory copy manner such as DMA, and then can continue to perform a forwarding task, and therefore in this process, the service carried by the secondary device needs to be interrupted for only a few seconds, so that an interruption time is shortened in a process of upgrading the secondary device. The secondary device updates the bandwidth allocation information of the accessed online ONU in the DBA manner, so that bandwidth can be dynamically switched while the ONU does not go offline.

Figure 3:
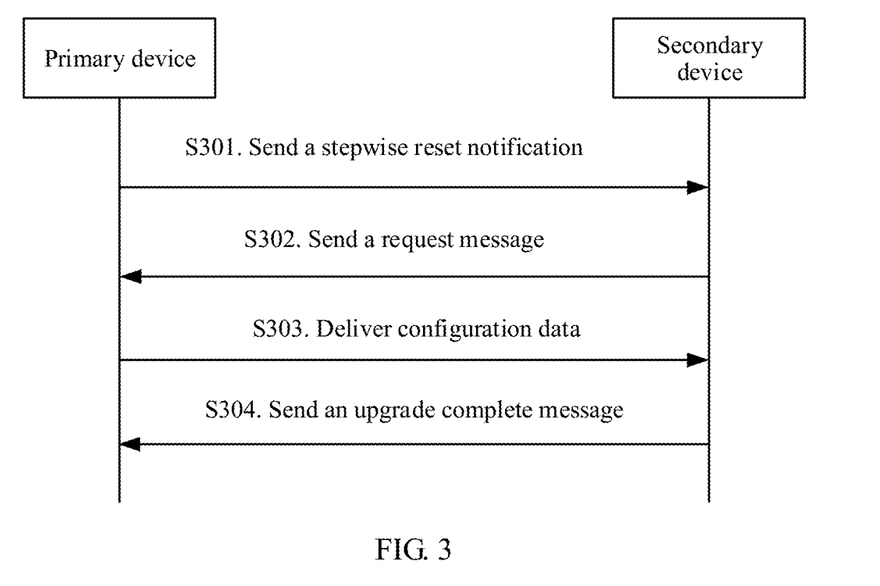
FIG. 3 is a schematic flowchart of another method for upgrading a primary device and a secondary device of an optical line terminal according to an embodiment of the present disclosure.

To better describe a process of upgrading a secondary device, FIG. 3 shows an example of a procedure of interaction between a primary device and a secondary device according to an embodiment of the present disclosure.

As shown in FIG. 3, the procedure specifically includes the following steps.

Step S301: The primary device sends a stepwise reset notification to the secondary device.

The stepwise reset notification is used to instruct the secondary device to make preparations before stepwise resetting. In a process of resetting the secondary device, the primary device suspends configuration data delivering.

Step S302: The secondary device sends a request message to the primary device.

After being stepwise reset, the secondary device sends the request message to the primary device, to notify the primary device that the secondary device has been stepwise reset, so as to request the primary device to deliver new configuration data.

Step S303: The primary device delivers configuration data to the secondary device.

After receiving the request message sent by the secondary device, the primary device starts to deliver the new configuration data to the secondary device, so that the secondary device forwards data according to the new configuration data.

Step S304: The secondary device sends an upgrade complete message to the primary device.

After being upgraded, the secondary device sends the upgrade complete message to the primary device. For a process of upgrading the secondary device, specifically refer to the procedure of the foregoing device upgrading method. Details are not described herein again.

Figure 4:
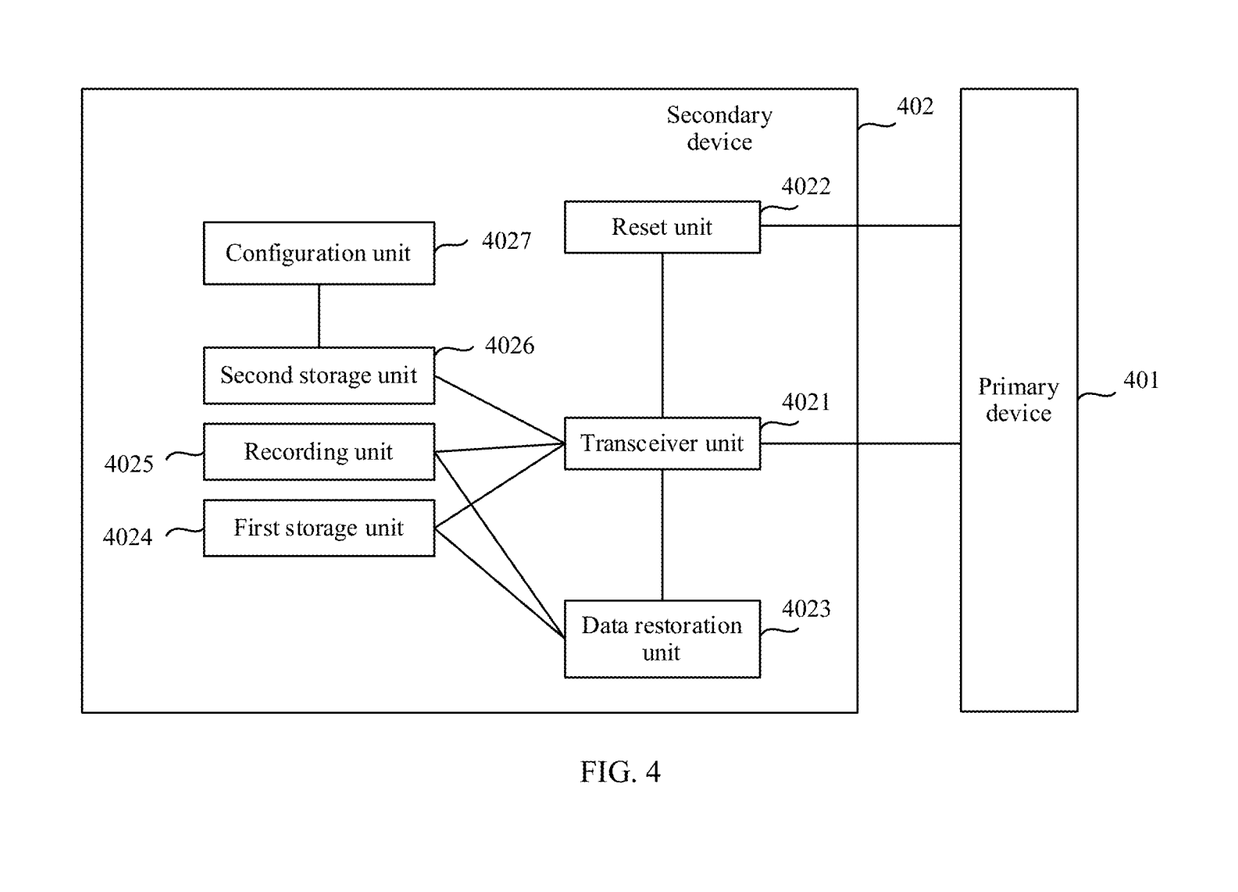
FIG. 4 is a schematic structural diagram of a secondary device according to an embodiment of the present disclosure.

Based on a same concept, FIG. 4 shows an example of a secondary device according to an embodiment of the present disclosure. The secondary device is configured to perform the foregoing method, and the device may be a secondary device 402 such as an IO board.

As shown in FIG. 4, the device specifically includes a transceiver unit 4021, a reset unit 4022, and a data restoration unit 4023.

The transceiver unit 4021 is configured to receive a stepwise reset notification sent by a primary device 401.

The reset unit 4022 is configured to reset a control chip according to the stepwise reset notification received by the transceiver unit 4021.

The transceiver unit 4021 is further configured to: send a request message to the primary device 401 after the control chip is reset, where the request message is used to request the primary device 401 to deliver new configuration data; and obtain the new configuration data delivered by the primary device.

The data restoration unit 4023 is configured to restore data of the control chip by using the new configuration data delivered by the primary device 401.

Preferably, a first storage unit 4024 is further included, and is configured to: before the reset unit 4022 resets the control chip, save forwarding data of a forwarding chip to a reset nonvolatile storage area, where an active area and a standby area are not set for the forwarding chip.

The data restoration unit 4023 is further configured to:

after the transceiver unit 4021 obtains the new configuration data delivered by the primary device 401, generate mirror data of a forwarding entry of the forwarding chip according to the obtained new configuration data delivered by the primary device 401 and the forwarding data that is of the forwarding chip and that is stored in the reset nonvolatile storage area; and upgrade the forwarding chip, and update the forwarding entry of the forwarding chip according to the mirror data of the forwarding entry of the forwarding chip after the forwarding chip is upgraded, so that the forwarding chip forwards data according to the updated forwarding entry.

Preferably, after the transceiver unit 4021 obtains the new configuration data delivered by the primary device 401, the data restoration unit 4023 is further configured to: generate a forwarding entry of a new version according to the new configuration data delivered by the primary device 401, and deliver the forwarding entry of the new version to a standby area, where the forwarding chip has an active area and a standby area;

upgrade the standby area of the forwarding chip, and switch, after the standby area of the forwarding chip is upgraded, a service carried in the active area of the forwarding chip to the standby area of the forwarding chip; and upgrade the active area of the forwarding chip.

Preferably, the secondary device further includes:

a recording unit 4025, configured to: before the reset unit 4022 resets the control chip, record bandwidth allocation information of an ONU.

The transceiver unit 4021 is further configured to deliver the bandwidth allocation information to an online ONU, and the bandwidth allocation information is used by the online ONU to switch bandwidth.

Preferably, the secondary device further includes:

a second storage unit 4026, configured to: before the reset unit 4022 resets the control chip, save configuration information of an ONU to a reset nonvolatile storage area; and a configuration unit 4027, configured to: after the data restoration unit 4023 restores the data of the control chip, reconfigure the configuration information of the ONU when the configuration information of the ONU that is stored in the reset nonvolatile storage area is inconsistent with configuration information of the ONU that is delivered by the primary device 401.

Figure 5:
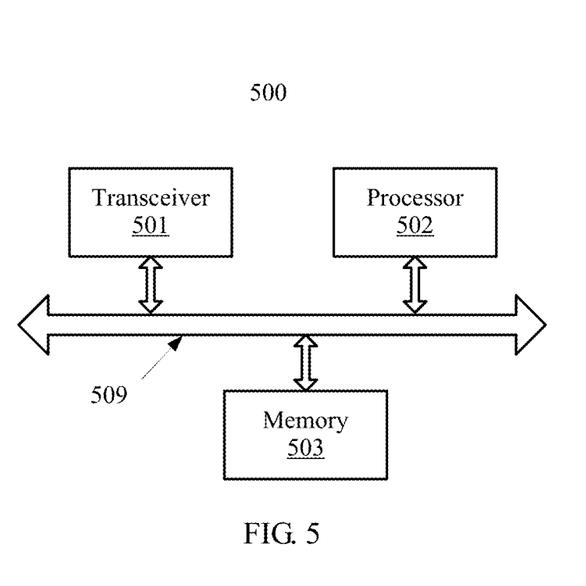
FIG. 5 is a schematic structural diagram of another secondary device according to an embodiment of the present disclosure.

Based on a same concept, referring to FIG. 5, FIG. 5 shows a secondary device 500 according to an embodiment of the present disclosure. The secondary device may include a transceiver 501, a processor 502, and a memory 503. The processor 502 is configured to control an operation of the device 500. The memory 503 may include a read-only memory and a random access memory, and store an instruction and data that may be executed by the processor 502. A part of the memory 503 may further include a nonvolatile random access memory (NVRAM). Components such as the transceiver 501, the processor 502, and the memory 503 are connected by using a bus 509. In addition to a data bus, the bus 509 may further include a power bus, a control bus, and a status signal bus. However, for clarity of description, various buses are marked as the bus 509 in the figure.

The method for upgrading the secondary device that is disclosed in the embodiments of the present disclosure may be applied to the processor 502, or implemented by the processor 502. In an implementation process, the steps in the processing procedure may be completed by using an integrated logic circuit of hardware in the processor 502 or an instruction in a form of software. The processor 502 may be a general-purpose processor, a digital signal processor, an application-specific integrated circuit, a field programmable gate array or another programmable logic device, a discrete gate or a transistor logic device, or a discrete hardware component, and may implement or execute methods, steps, and logic block diagrams that are disclosed in the embodiments of the present disclosure. The general-purpose processor may be a microprocessor, any conventional processor, or the like. The steps of the method disclosed with reference to the embodiments of the present disclosure may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 503. The processor 502 reads information stored in the memory 503, and completes the steps of the method for upgrading a device in combination with hardware of the processor 502.

The transceiver 501 receives a stepwise reset notification sent by a primary device. The processor 502 resets a control chip according to the stepwise reset notification received by the transceiver, and instructs, after the control chip is reset, the transceiver 501 to send a request message to the primary device, and the request message is used to request the primary device to deliver new configuration data. The transceiver 501 receives the new configuration data delivered by the primary device. The processor 502 invokes the instruction and data stored in the memory 503, and restores data of the control chip by using the new configuration data delivered by the primary device.

Preferably, before the control chip is reset, the processor 502 may further save forwarding data of a forwarding chip to a reset nonvolatile storage area, and an active area and a standby area are not set for the forwarding chip. After obtaining the new configuration data delivered by the primary device, the processor generates mirror data of a forwarding entry of the forwarding chip according to the obtained new configuration data delivered by the primary device and the forwarding data that is stored in the reset nonvolatile storage area and that is of the forwarding chip. The processor upgrades the forwarding chip, and after the forwarding chip is upgraded, updates the forwarding entry of the forwarding chip according to the mirror data of the forwarding entry of the forwarding chip, so that the forwarding chip forwards data according to the updated forwarding entry.

Preferably, the processor 502 may further generate a forwarding entry of a new version according to the new configuration data delivered by the primary device, and deliver the forwarding entry of the new version to a standby area. The forwarding chip has an active area and a standby area. The processor 502 upgrades the standby area of the forwarding chip, switches, after the standby area of the forwarding chip is upgraded, a service carried in the active area of the forwarding chip to the standby area of the forwarding chip, and upgrades the active area of the forwarding chip.

Preferably, before the control chip is reset, the processor 502 may further record bandwidth allocation information of an ONU. The processor 502 delivers the bandwidth allocation information to the online ONU, and the bandwidth allocation information is used by the online ONU to switch bandwidth.

Preferably, before the control chip is reset, the processor 502 may further save configuration information of an ONU to a reset nonvolatile storage area. After the data of the control chip is restored, the processor 502 reconfigures the configuration information of the ONU when the configuration information of the ONU that is stored in the reset nonvolatile storage area is inconsistent with configuration information of the ONU that is delivered by the primary device.

Persons skilled in the art should understand that the embodiments of the present disclosure may be provided as a method, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for upgrading a primary device and a secondary device of an optical line terminal, the method comprising:
receiving, by the secondary device, a stepwise reset notification sent by the primary device, the stepwise reset notification indicating a control chip is to be reset while a forwarding chip is operational;
resetting, by the secondary device, the control chip according to the received stepwise reset notification, and sending a request message to the primary device after the control chip is reset, the request message for requesting the primary device to deliver new configuration data;
obtaining, by the secondary device, the new configuration data delivered by the primary device;
restoring, by the secondary device, data of the control chip by using the new configuration data delivered by the primary device; and
upgrading, by the secondary device, the forwarding chip after restoring the data of the control chip.

2. The method according to claim 1, wherein:
before resetting, by the secondary device, the control chip, the method further comprises:
saving, by the secondary device, forwarding data of a forwarding of the forwarding chip to a nonvolatile storage area, wherein an active area and a standby area are not set for the forwarding chip; and
after obtaining, by the secondary device, the new configuration data delivered by the primary device, the method further comprises:
generating, by the secondary device, mirror data of a forwarding entry of the forwarding chip according to the obtained new configuration data delivered by the primary device and the forwarding data that is of the forwarding chip and that is stored in the reset nonvolatile storage area, and
updating the forwarding entry of the forwarding chip according to the mirror data of the forwarding entry of the forwarding chip after the forwarding chip is upgraded, so that the forwarding chip forwards data according to the updated forwarding entry.

3. The method according to claim 1, wherein after obtaining, by the secondary device, the new configuration data delivered by the primary device, the method further comprises:
generating, by the secondary device, a forwarding entry of a new version according to the new configuration data delivered by the primary device, and delivering the forwarding entry of the new version to a standby area, wherein the forwarding chip has an active area and a standby area;
upgrading, by the secondary device, the standby area of the forwarding chip, and switching, after the standby area of the forwarding chip is upgraded, a service carried in the active area of the forwarding chip to the standby area of the forwarding chip; and
upgrading, by the secondary device, the active area of the forwarding chip.

4. The method according to claim 1, wherein:
before resetting, by the secondary device, the control chip, the method further comprises:
recording, by the secondary device, bandwidth allocation information of an optical network terminal (ONU); and
after restoring the data of the control chip, the method further comprises:
delivering, by the secondary device, the bandwidth allocation information to an online ONU for switching bandwidth.

5. The method according to claim 1, wherein:
before resetting, by the secondary device, the control chip, the method further comprises:
saving, by the secondary device, configuration information of an optical network terminal (ONU) to a reset nonvolatile storage area; and
after restoring the data of the control chip, the method further comprises:
reconfiguring, by the secondary device, the configuration information of the ONU when the configuration information of the ONU that is stored in the reset nonvolatile storage area is inconsistent with configuration information of the ONU that is delivered by the primary device.

6. A secondary device, comprising:
a transceiver configured to receive a stepwise reset notification sent by a primary device, the stepwise reset notification indicating a control chip is to be reset while a forwarding chip is operational;
a reset unit configured to reset the control chip according to the stepwise reset notification received by the transceiver unit;
wherein the transceiver unit is further configured to:
send a request message to the primary device after the control chip is reset, the request message for requesting the primary device to deliver new configuration data, and
obtain the new configuration data delivered by the primary device; and
a data restoration unit configured to:
restore data of the control chip by using the new configuration data delivered by the primary device; and
upgrade the forwarding chip after restoring the data of the control chip.

7. The device according to claim 6, further comprising:
a first storage unit configured to:
before the reset unit resets the control chip, save forwarding data of a forwarding chip to a reset nonvolatile storage area, wherein an active area and a standby area are not set for the forwarding chip; and
the data restoration unit is further configured to:
after the transceiver obtains the new configuration data delivered by the primary device, generate mirror data of a forwarding entry of the forwarding chip according to the obtained new configuration data delivered by the primary device and the forwarding data that is of the forwarding chip and that is stored in the reset nonvolatile storage area, and
update the forwarding entry of the forwarding chip according to the mirror data of the forwarding entry of the forwarding chip after the forwarding chip is upgraded, to enable the forwarding chip to forward data according to the updated forwarding entry.

8. The device according to claim 6, wherein the data restoration unit is further configured to:
after the transceiver obtains the new configuration data delivered by the primary device, generate a forwarding entry of a new version according to the new configuration data delivered by the primary device, and deliver the forwarding entry of the new version to a standby area, wherein the forwarding chip has an active area and a standby area;
upgrade the standby area of the forwarding chip, and switch, after the standby area of the forwarding chip is upgraded, a service carried in the active area of the forwarding chip to the standby area of the forwarding chip; and
upgrade the active area of the forwarding chip.

9. The device according to claim 6, further comprising:
a recording unit configured to: before the reset unit resets the control chip, record bandwidth allocation information of an optical network terminal (ONU); and
wherein the transceiver is further configured to deliver the bandwidth allocation information to an online ONU for switching bandwidth.

10. The device according to claim 6, further comprising:
a second storage unit configured to: before the reset unit resets the control chip, save configuration information of an optical network terminal (ONU) to a reset nonvolatile storage area; and
a configuration unit configured to: after the data restoration unit restores the data of the control chip, reconfigure the configuration information of the ONU when the configuration information of the ONU that is stored in the reset nonvolatile storage area is inconsistent with configuration information of the ONU that is delivered by the primary device.

11. A method for upgrading a primary device and a secondary device of an optical line terminal, the method comprising:
receiving, by the secondary device, a stepwise reset notification sent by the primary device;
recording, by the secondary device, bandwidth allocation information of an optical network terminal (ONU); and
resetting, by the secondary device, a control chip according to the received stepwise reset notification, and sending a request message to the primary device after the control chip is reset, the request message for requesting the primary device to deliver new configuration data;
obtaining, by the secondary device, the new configuration data delivered by the primary device;
restoring, by the secondary device, data of the control chip by using the new configuration data delivered by the primary device; and
delivering, by the secondary device, the bandwidth allocation information to an online ONU for switching bandwidth.

12. The method according to claim 11, further comprising:
saving, by the secondary device, forwarding data of a forwarding chip to a nonvolatile storage area, wherein an active area and a standby area are not set for the forwarding chip; and
generating, by the secondary device, mirror data of a forwarding entry of the forwarding chip according to the obtained new configuration data delivered by the primary device and the forwarding data that is of the forwarding chip and that is stored in the reset nonvolatile storage area; and
upgrading, by the secondary device, the forwarding chip, and updating the forwarding entry of the forwarding chip according to the mirror data of the forwarding entry of the forwarding chip after the forwarding chip is upgraded, so that the forwarding chip forwards data according to the updated forwarding entry.

13. The method according to claim 11, further comprising:
generating, by the secondary device, a forwarding entry of a new version according to the new configuration data delivered by the primary device, and delivering the forwarding entry of the new version to a standby area, wherein the forwarding chip has an active area and a standby area;
upgrading, by the secondary device, the standby area of the forwarding chip, and switching, after the standby area of the forwarding chip is upgraded, a service carried in the active area of the forwarding chip to the standby area of the forwarding chip; and
upgrading, by the secondary device, the active area of the forwarding chip.

14. The method according to claim 11, further comprising:
- saving, by the secondary device, configuration information of the optical network ONU to a reset nonvolatile storage area; and
- reconfiguring, by the secondary device, the configuration information of the ONU when the configuration information of the ONU that is stored in the reset nonvolatile storage area is inconsistent with configuration information of the ONU that is delivered by the primary device.

* * * * *